(12) United States Patent
Lee

(10) Patent No.: US 10,395,225 B2
(45) Date of Patent: Aug. 27, 2019

(54) DISTRIBUTED PROCESSING SYSTEM FOR PROCESSING TRANSPORTATION FEES AND OPERATING METHOD THEREOF

(71) Applicant: LG CNS CO., LTD., Seoul (KR)

(72) Inventor: Yongkyu Lee, Seoul (KR)

(73) Assignee: LG CNS CO., LTD., Seoul (KR)

( * ) Notice: Subject to any disclaimer, the term of this patent is extended or adjusted under 35 U.S.C. 154(b) by 822 days.

(21) Appl. No.: 14/503,099

(22) Filed: Sep. 30, 2014

(65) Prior Publication Data

US 2016/0092856 A1 Mar. 31, 2016

(51) Int. Cl.
```
G06Q 20/14    (2012.01)
G06Q 20/34    (2012.01)
G06Q 20/18    (2012.01)
G07C 9/00     (2006.01)
```

(52) U.S. Cl.
CPC .......... *G06Q 20/145* (2013.01); *G06Q 20/18* (2013.01); *G06Q 20/34* (2013.01); *G06Q 20/352* (2013.01); *G07C 9/00111* (2013.01)

(58) Field of Classification Search
None
See application file for complete search history.

(56) References Cited

U.S. PATENT DOCUMENTS 5,548,533 A * 8/1996 Gao .................. H04Q 3/54591
455/445
5,574,770 A * 11/1996 Yoo .................. H04Q 3/54591
379/111
5,675,494 A * 10/1997 Sakurai ................ G07B 15/063
705/417
5,862,348 A * 1/1999 Pedersen .................. G06F 9/505
709/226
6,788,648 B1 * 9/2004 Peterson ............... G06F 9/5083
370/252

(Continued)

FOREIGN PATENT DOCUMENTS

KR      10-1214627 B1     12/2012
KR    10-2013-0047523 A    5/2013
KR    10-2013-0067933 A    6/2013

OTHER PUBLICATIONS

Kaneuchi, Ryoji, Toll System, Double Charging Prevention Method, and Non-Contact IC Card, Dec. 24, 2004, Japan, all.*

(Continued)

*Primary Examiner* — Christopher Bridges

(57) ABSTRACT

An operating method of a distributed server includes downloading operating information from a central server, the operating information including information related to card transactions and terminal information on one or more card terminals, receiving a payment request for a card tagged on a card terminal from the card terminal, and performing an operation related to a payment requested by the card terminal based on the operating information. The operating method may further include receiving status information from the central server, the status information indicating whether or not the central server is overloaded, processing the payment requested by the card terminal if the status information indicates that the central server is overloaded, and transmitting a result of processing the payment to the card terminal.

17 Claims, 10 Drawing Sheets

(56) References Cited

U.S. PATENT DOCUMENTS

| | | | | |
|---|---|---|---|---|
| 6,801,949 B1* | 10/2004 | Bruck | ............... | H04L 29/12009 709/232 |
| 7,752,629 B2* | 7/2010 | Revanuru | ............... | G06F 9/505 709/201 |
| 8,027,843 B2* | 9/2011 | Bodin | ................ | B60R 16/0232 705/1.1 |
| 9,535,926 B2* | 1/2017 | Avati | .................. | G06F 16/1865 |
| 2003/0135613 A1* | 7/2003 | Yoshida | ............ | H04L 29/12113 709/224 |
| 2003/0191709 A1* | 10/2003 | Elston | .................... | G06Q 20/04 705/40 |
| 2005/0114862 A1* | 5/2005 | Bisdikian | .............. | G06F 9/5072 718/105 |
| 2006/0278704 A1* | 12/2006 | Saunders | ............... | G06Q 20/10 235/382 |
| 2007/0012763 A1 | 1/2007 | Van De Velde et al. | | |
| 2010/0274893 A1* | 10/2010 | Abdelal | .............. | H04L 29/0602 709/224 |
| 2012/0030749 A1* | 2/2012 | Anderson | ............... | H04L 63/08 726/12 |
| 2014/0019216 A1* | 1/2014 | Jo | ...................... | G06Q 20/3278 705/13 |
| 2015/0244796 A1* | 8/2015 | Joy | .................... | H04L 67/1095 709/203 |

OTHER PUBLICATIONS

Extended European Search Report for European Application No. 15173097.5, dated Oct. 26, 2015.

* cited by examiner

DISTRIBUTED PROCESSING SYSTEM FOR PROCESSING TRANSPORTATION FEES AND OPERATING METHOD THEREOF

TECHNICAL FIELD

Embodiments of the present disclosure relate to a distributed processing system for processing transportation fees and an operating method thereof.

BACKGROUND

When a card terminal reads a card and transmits read data, e.g., payment data, to a server, the server approves the payment and provides the approval result to the card terminal. If a plurality of card terminals simultaneously reads cards and transmits read data to the server, the server spends a lot of time to process the data from the card terminals, and thus the processing load on the server inevitably increases.

SUMMARY

Embodiments of the present disclosure are directed to a distributed processing system and a method of operating the same, which are capable of normally processing a payment transaction for a card using a plurality of distributed servers, each of which is installed at a region or station, even when a central server cannot process the payment for the card.

Embodiments of the present disclosure are directed to a system and a method of operating the same, which are capable of continuing communication between a central server and a distributed server by setting a bypass route between the plurality of distributed servers when trouble occurs in a communication line between the central server and the distributed server.

Embodiments of the present disclosure are directed to a system and a method of operating the same, which connect a central server and a distributed server through a wired network and connect the distributed server and card terminals through a wireless network, thereby reducing communication line costs.

In accordance with an embodiment of the present disclosure, an operating method of a distributed server includes: downloading operating information from a central server, the operating information including information related to card transactions and terminal information on one or more card terminals; receiving a payment request for a card tagged on a card terminal from the card terminal; and performing an operation related to a payment requested by the card terminal based on the operating information.

The operation method may further include receiving status information from the central server, the status information indicating whether or not the central server is overloaded; processing the payment requested by the card terminal if the status information indicates that the central server is overloaded; and transmitting a result of processing the payment to the card terminal.

The status information may be pushed to the distributed server from the central server when the central server is in an overloaded state in which traffic for card payments exceeds a processing limit of the central server or after the overload of the central server is resolved.

The processing limit may include a preset limit for at least one of the number of transactions being simultaneously processed, a processing time for each transaction, and available resources of the central server.

When the status information is first status information, the operating method may further include: receiving second status information from the central server, the second status information indicating whether or not the overload of the central server was resolved; and requesting the central server to process the payment requested by the card terminal if the second status information indicates that the overload of the central server was resolved.

Receiving the status information may include receiving the status information through a communication channel that is separate from a communication channel through which the operating information is received.

Performing the operation related to the payment may include processing the payment if the card tagged on the card terminal is determined to be a commutation ticket based on the operating information.

Performing the operation related to the payment may include: determining whether or not the card is tagged on the card terminal more than one time within a predetermined time based on the operating information; informing the card terminal that a transportation fee for the card has been paid if it is determined that the card is tagged more than one time within the predetermined time; and requesting the central server to process the payment for the card if it is determined that the card is tagged only one time.

The operating method may further include: searching for another distributed server capable of communicating with the central server if communication between the central server and the distributed server is disconnected; and communicating with the central server through a found distributed server.

The operating method may further include transmitting the operating information to another distributed server that is unable to communicate with the central server.

In accordance with another embodiment of the present disclosure, an operating method of a central server includes: determining whether traffic for card payments, received from one or more of one or more distributed servers and one or more card terminals, exceeds a processing limit of the central server; and transmitting status information to the one or more distributed servers based on the determination result, the status information indicating whether or not the central server is overloaded.

When the status information is first status information, the method may further include: determining whether or not the overload has been resolved; and transmitting second status information to the one or more distributed servers, the second status information indicating that the overload of the central server has been resolved.

The status information may be pushed to the one or more distributed servers from the central server when the central server is in an overloaded state in which the traffic exceeds the processing limit or after the overload of the central server is resolved.

The processing limit of the central server may include a preset limit for at least one of the number of transactions being simultaneously processed, a processing time for each transaction, and available resources of the central server.

The operating method may further include transmitting operating information to the one or more distributed servers, the operating information including information related to transactions of cards and terminal information on one or more card terminals.

Transmitting the status information may include transmitting the status information through a communication channel that is separate from a communication channel through which the operating information is transmitted.

In accordance with still another embodiment of the present disclosure, a distributed server includes: a memory configured to store a program for controlling operations of the distributed server; and one or more processors configured to execute the program, wherein the processor performs a method, the method including: downloading operating information including information related to card transactions and information on one or more card terminals from a central server; receiving a payment request for a card tagged on a card terminal from the card terminal; and performing an operation related to a payment requested by the card terminal based on the operating information.

The method may further include: receiving status information from the central server, the status information indicating whether or not the central server is overloaded; processing the payment requested by the card terminal if the status information indicates that the central server is overloaded; and transmitting a result of processing the payment to the card terminal.

In accordance with further still another embodiment of the present disclosure, a distributed processing system includes: one or more card terminals each of which is configured to request a payment for a card tagged thereon; one or more distributed servers configured to receive operating information, which includes information related to transactions of the card and terminal information on the one or more card terminals, and status information, which indicates whether or not a central server is overloaded, from the central server, and perform an operation related to the payment for the card based on the operating information and the status information; and the central server configured to determine whether or not traffic for payments of cards, received from one or more of the one or more card terminals and the one or more distributed servers, exceeds a processing limit thereof, and transmit the status information to the one or more distributed servers based on the determination result.

In accordance with further still another embodiment of the present disclosure, a non-transitory computer-readable medium has stored thereon computer-executable instructions, which, when executed by a processor in a distributed server, performs a method, the method including: downloading operating information from a central server, the operating information including information related to card transactions and terminal information on one or more card terminals; receiving a payment request for a card tagged on a card terminal from the card terminal; processing a payment requested by the card terminal based on the operating information if first status information is received from the central server, the first status information indicating that the central server is overloaded, and transmitting a result of the payment processed by the distributed server to the card terminal; and requesting the central server to process the payment requested by the card terminal if second status information is received from the central server, the second status information indicating that the overload of the central server was resolved.

According to embodiments of the present disclosure, payment data received from a plurality of card terminals may be processed in a short time through a plurality of distributed servers each of which is installed at a region or station, and thus a card payment process may be normally performed even when a central server cannot process the payment data from the plurality of card terminals.

Furthermore, when a problem occurs in a communication line between a central server and a distributed server, a bypass route may be set between a plurality of distributed servers so as to continue communication between the central server and the distributed server.

Furthermore, a central server and a distributed server may be connected through a wired network, and the distributed server and card terminals may be connected through a wireless network. Thus, communication line costs are less than when a wired network is used for communication between the central server and the terminals.

DESCRIPTION OF SPECIFIC EMBODIMENTS

Figure 1:
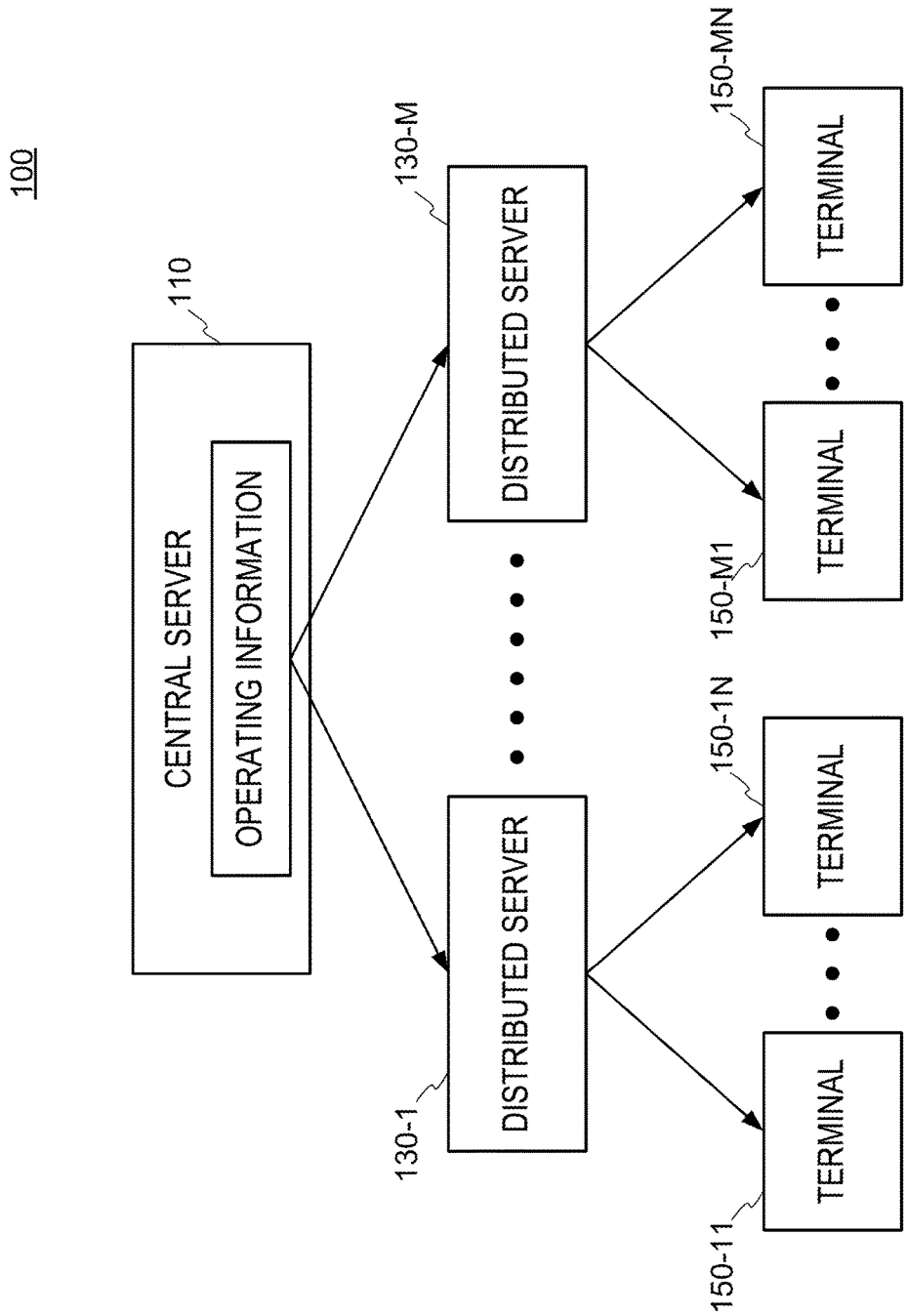
FIG. 1 illustrates a distributed processing system according to an embodiment of the present disclosure.

Hereafter, embodiments of the present disclosure will be described in more detail with reference to the accompanying drawings. Throughout the drawings, like reference numerals refer to like parts.

The following embodiments may be modified in various manners. Embodiments are not limited by the descriptions provided herein, but may include all modifications, equivalents or substitutes thereof.

The terms used to describe embodiments are used for explaining specific embodiments, and do not limit embodiments. Terms in a singular form do not exclude plural forms unless the contrary is indicated. In this specification, the meaning of "include," "comprise" or "have" specifies a property, a figure, a step, a process, an element, a component, or a combination thereof which is described in the specification, without excluding one or more other properties, numbers, steps, processes, elements, components, or combinations thereof.

Terms used herein that are technical or scientific terms have the same meanings as the terms which are generally understood by those skilled in the art to which the present disclosure pertains, unless they are differently defined herein. Terms defined in a generally used dictionary may be interpreted to have meanings which coincide with contextual meanings in the related art. If terms are not clearly defined in this specification, they may not be interpreted as having ideal or excessively formal or technical meanings.

In the accompanying drawings, like reference numerals refer to like elements, regardless of reference numerals, and the duplicated descriptions thereof may be omitted. In the present disclosure, detailed descriptions related to well-known functions or configurations may be omitted so that the subject matter of the present disclosure is not unnecessarily obscured.

FIG. 1 illustrates a distributed processing system according to an embodiment of the present disclosure. The distributed processing system includes a central server 110, a plurality of distributed servers 130-1 to 130-M, and a plurality of terminals 150-11 to 150-MN, M and N being a natural number.

The central server 110 may transmit operating information to the plurality of distributed servers 130-1 to 130-M, and manage information related to calculations of transportation fees for cards tagged on the plurality of terminals 150-11 to 150-MN and information related to transactions of the cards. The operating information may include card status information related to transactions of the cards and terminal information of one or more terminals. The terminal information may include information used for operations of the terminals.

The distributed servers 130-1 to 130-M may be disposed between the central server 110 and the terminals 150-11 to 150-MN, and serve to distribute loads of the central server 110 and manage connections to the central server 110. The distributed servers 130-1 to 130-M may download the operating information from the central server 110. The distributed servers 130-1 to 130-M may transmit the operating information, downloaded from the central server 110, to the plurality of terminals 150-11 to 150-MN, thereby reducing a transmission load on the central server 110.

The central server 110 may determine whether or not traffic for card payments, received from one or more of the distributed servers 130-1 to 130-M and the terminals 150-11 to 150-MN, exceeds a processing limit thereof. The central server 110 may transmit status information thereof to the distributed servers 130-1 to 130-M based on the determination result. The central server 110 may transmit the status information to the distributed servers 130-1 to 130-M when the processing limit is exceeded (i.e., when an overload occurs) or when an overload of the central server 110 is resolved.

In another embodiment, the central server 110 may transmit the operating information and the status information only to a specific distributed server among the distributed servers 130-1 to 130-M.

In still another embodiment, the central server 110 may directly transmit the operating information and the status information to one or more of the terminals 150-11 to 150-MN.

The plurality of terminals 150-11 to 150-MN may transmit data for processing card payments for the cards tagged on the terminals 150-11 to 150-MN to the distributed servers 130-1 to 130-M through wired or wireless communications, and then the distributed servers 130-1 to 130-M may transmit data for requesting and processing the card payments to the central server 110. The card payments requested by the terminals 150-11 to 150-MN may be processed by the distributed servers 130-1 to 130-M or the central server 110, depending on the situation, e.g., based on the status information of the central server 110.

The distributed servers 130-1 to 130-M may process the card payments based on the operating information and the status information from the central server 110. The operating information may include card status information related to transactions of the cards, and terminal information of one or more terminals. The card status information may include a hot list, commutation ticket information, and so on. The hot list includes information related to whether or not the cards are available, and may include at least one of a black list and a white list.

The black list includes information on cards in which a payment exceeds a predetermined amount or information on cards in which use is suspended or prohibited. That is, the black list may include information on cards that may not be used to pay transportation fees. The white list includes information on available cards that can be used to pay transportation fees. For example, the white list may also include information on cards which had been on the black list but now have become available because the suspension or prohibition therefor was canceled.

The distributed servers 130-1 to 130-M may be locally installed at predetermined places such as train stations and/or bus terminals. The distributed servers 130-1 to 130-M may be implemented with mobile servers and/or fixed servers.

The distributed servers 130-1 to 130-M may perform wired/wireless communications such as Ethernet, Wi-Fi, Bluetooth, 3G, LTE (Long Term Evolution), and Wibro. The distributed servers 130-1 to 130-M may perform functions of mobile communication servers.

Each of the distributed servers 130-1 to 130-M and the terminals 150-11 to 150-MN may be connected to each other through a wireless network such as cellular communication, Wi-Fi, TRS (Trunked Radio Services) or LAN (local area network).

The plurality of terminals 150-11 to 150-MN may be installed at various places such as a train station, a bus terminal, a vehicle, and a garage, which provide a service related to payment of transportation fees.

The plurality of terminals 150-11 to 150-MN may read cards tagged thereon, e.g., cards within a predetermined distance thereof, and request the central server 110 or the distributed servers 130-1 to 130-M to process payments for the cards.

The plurality of terminals 150-11 to 150-MN may access the distributed servers 130-1 to 130-M so as to download the operating information.

When the plurality of terminals 150-11 to 150-MN transmits data for processing card payments to the distributed servers 130-1 to 130-M through wired/wireless communications, the distributed servers 130-1 to 130-M may determine whether or not to approve the data for processing card payments and transmit the processing results to the terminals 150-11 to 150-MN and the central server 110.

In the distributed processing system, when the plurality of terminals 150-11 to 150-MN simultaneously attempt to access the central server 110 so as to process card payments, the distributed servers 130-1 to 130-M may process the card payments instead of the central server 110, thereby distributing a processing load of the central server 110.

Figure 2:
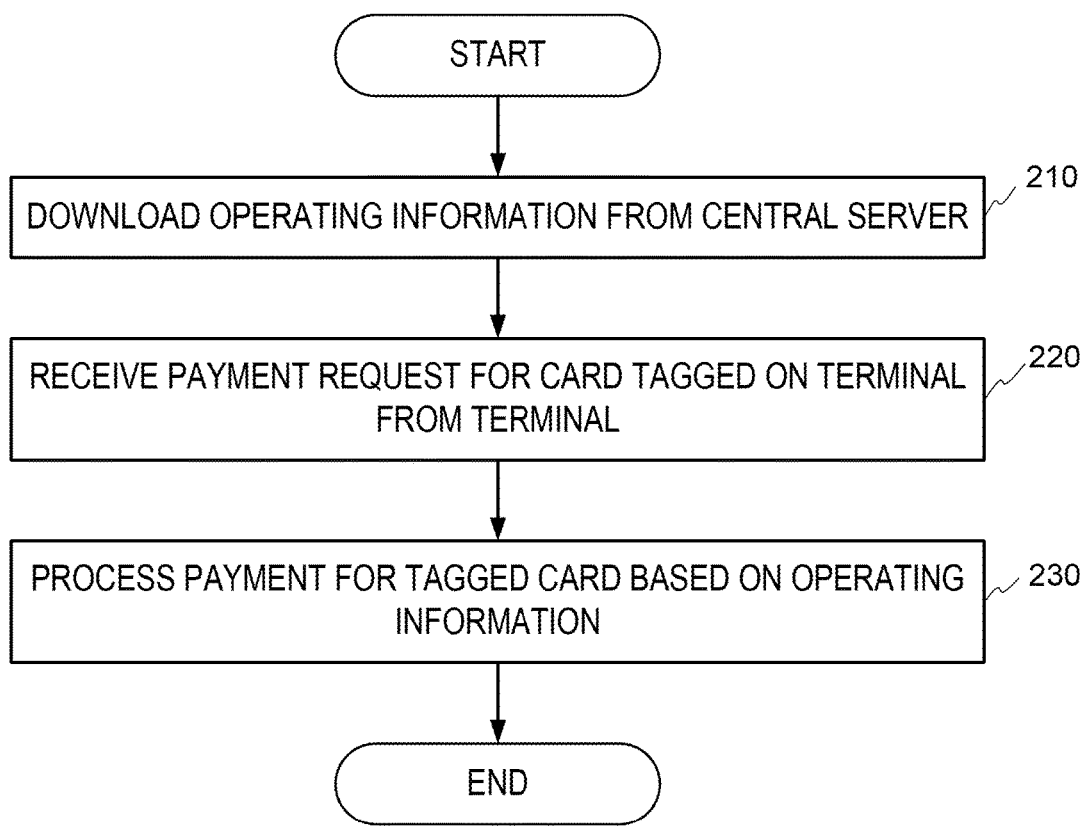
FIG. 2 is a flowchart illustrating an operating method of a distributed server according to an embodiment of the present disclosure.

FIG. 2 is a flowchart illustrating an operating method of a distributed server according to an embodiment of the present disclosure.

At step 210, the distributed server downloads operating information including information related to card transactions and terminal information of one or more terminals from a central server.

The distributed server may receive a payment request for a card tagged on a terminal from the terminal at step 220. Tagging may include actions performed to process a card payment, such as bringing the card within a predetermined distance of a card reader of a terminal or touching the card to the card reader. However, tagging may also include various actions related to reading card information and processing a card payment in addition to bringing the card close to the terminal or bringing the card into contact with the terminal.

At step 230, the distributed server may process a payment for the card tagged at the step S220 based on the operating information downloaded at step S210. For example, when the tagged card is determined to be a commutation ticket based on the operating information downloaded at step S210, the distributed server can process the payment for the card tagged on the terminal.

Figure 3:
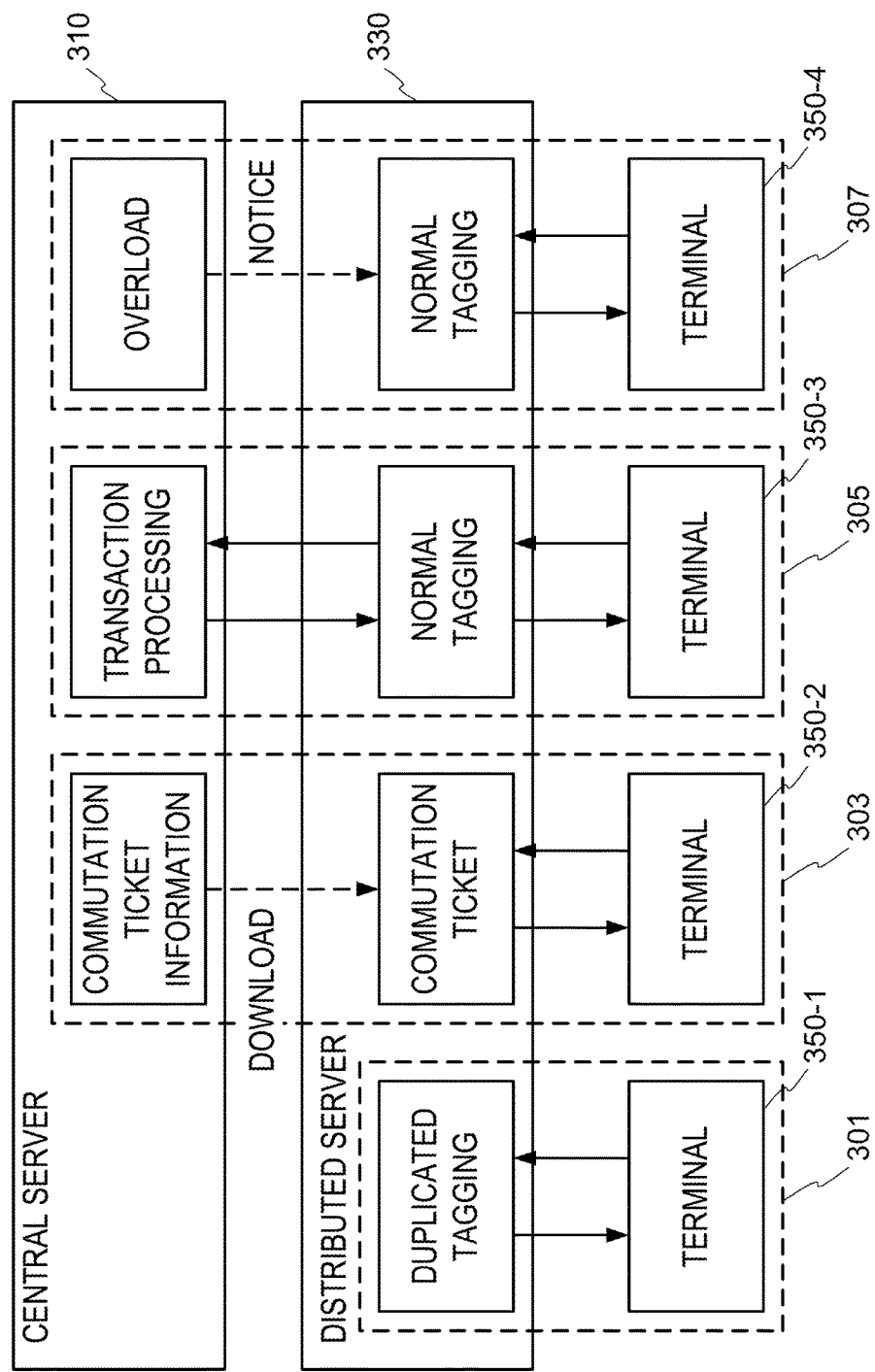
FIG. 3 illustrates operations of a central server, a distributed server, and terminals in a distributed processing system according to an embodiment of the present disclosure.

FIG. 3 illustrates operations of a central server, a distributed server, and terminals in a distributed processing system according to an embodiment of the present disclosure. The distributed processing system includes a central server 310, a distributed server 330, and terminals 350-1 to 350-4.

When a user tags a card on any one of the terminals 350-1 to 350-4, an inquiry about use history of the tagged card may be transmitted to the distributed server 330, and then transmitted to the central server 310 from the distributed server 330 to process the inquiry. The inquiry about the use history in the terminal, e.g., 350-1, is transmitted to the central server 310 via the distributed server 330 so as to prevent duplicate approval.

For example, although a user may tag a card on the terminal 350-1 several times within a predetermined time period, as indicated by reference numeral 301, i.e., there is duplicate tagging, a transportation fee for the card should only be paid one time. The distributed server 330 may check whether or not the transportation fee for the card tagged on the terminal 350-1 has been paid by checking operating information, which contains transaction data of the card and is received from the central server 310.

If it is determined that the card was tagged more than one time for one transaction, the distributed server 330 may inform the terminal 350-1 that the transportation fee has been paid, i.e., the corresponding transaction has been completed. On the other hand, if it is determined that the card was tagged only one time, the distributed server 330 may request the central server 310 to process a payment for the tagged card.

Furthermore, the central server 310 may store operating information including a valid commutation ticket list, as indicated by reference numeral 303, and transmit the stored commutation ticket list to the distributed server 330. Thus, when the card tagged on the terminal 350-2 is determined to be a commutation ticket included in the commutation ticket list based on the operating information, the distributed server 330 may process the tagged card without accessing the central server 310. This is because the transportation fee for the commutation ticket does not need to be calculated.

If a card tagged on the terminal 350-3 is a normally tagged card as indicated by reference numeral 305, the distributed server 330 may request the central server 310 to process a payment for the normally tagged card. The normally tagged card represents a card that is tagged only one time. After processing the payment for the tagged card, the central server 310 may store transaction data of the tagged card therein or transmit the transaction data to the distributed server 330.

Reference numeral 307 represents the case in which excessive traffic is concentrated on the central server 310 and exceeds a processing limit of the central server 310. The central server 310 may transmit first status information thereof to the distributed server 330, the first status information indicating that the central server 310 is overloaded.

At this time, when the traffic exceeds a preset limit for at least one of the number of transactions that can be simultaneously processed, a processing time for each transaction, and available resources of the central server 310, the central server 310 may push the first status information to the distributed server 330 to inform the distributed server 330 that the central server 310 is overloaded. The pushing is an operation in which the central server 310 automatically transmits its status information to the distributed server 330 without receiving a request from the distributed server 330.

The distributed server 330 receiving the first status information indicating that the central server 310 is overloaded may set an operation mode thereof to a first operation mode, and process a card transaction requested by the terminal 350-4 using information stored therein, without accessing the central server 310.

In the first operation mode, the distributed server 330 processes a card payment requested by the terminal 350-4, and transmits a result of processing the card payment to the terminal 350-4.

After that, when the overload of the central server 310 is resolved, the central server 310 may push second status information to the distributed server 330, the second status information indicating that the overload of the central server 310 has been resolved.

When the second status information is received indicating that the overload of the central server 310 has been resolved, the distributed server 330 may switch from the first operation mode to a second operation mode. In the second operation mode, the distributed server 330 requests the central server 310 to process a transaction, e.g., a card payment, requested by the terminal 350-4.

An operating method for a case in which a central server transmits status information to a distributed server will be described with reference to FIGS. 5 and 6.

An operation or state management based on the above-described status information may be performed by a status management unit of the central server 310. The distributed server 330 may receive the status information from the central server 310 through a communication channel that is separate from a communication channel through which the operating information is received.

Figure 4:
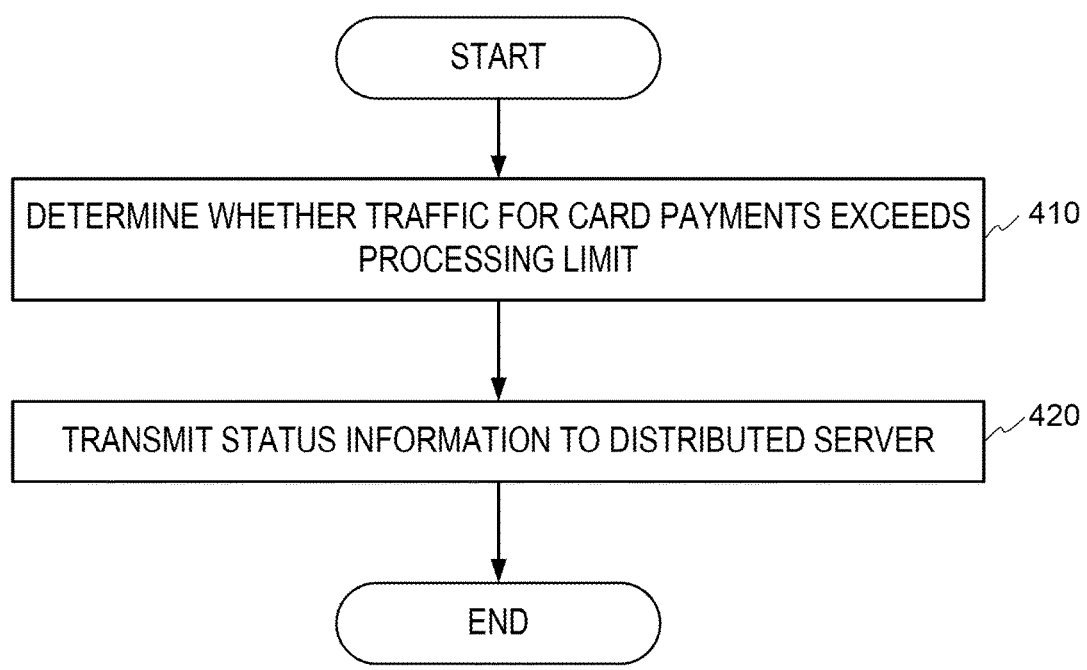
FIG. 4 is a flowchart illustrating an operating method of a central server according to an embodiment of the present disclosure.

FIG. 4 is a flowchart illustrating an operating method of a central server according to an embodiment of the present disclosure.

Referring to FIG. 4, the central server determines whether or not traffic for card payments exceeds a processing limit thereof, at step 410. The traffic may be received from one or more of one or more distributed servers and one or more terminals. The processing limit may include a preset limit for at least one of the number of transactions that can be simultaneously processed, a processing time for each transaction, and available resources of the central server.

At step 420, the central server transmits first status information to the distributed servers based on the determination result of step 410. The first status information indicates whether or not the central server is overloaded. The first status information may be pushed to the distributed servers from the central server when the central server is in an overloaded state in which traffic exceeds the processing limit of the central server.

After transmitting the first status information indicating that the central server is overloaded to the distributed servers, the central server may determine whether or not the overload has been resolved. When it is determined that the overload has been resolved, the central server may transmit second status information to the distributed servers so as to notify the distributed servers that the overload was resolved.

In an embodiment, the central server may transmit the first and/or second status information through a communication channel that is separate from a communication channel through which operating information is transmitted.

Figure 5:
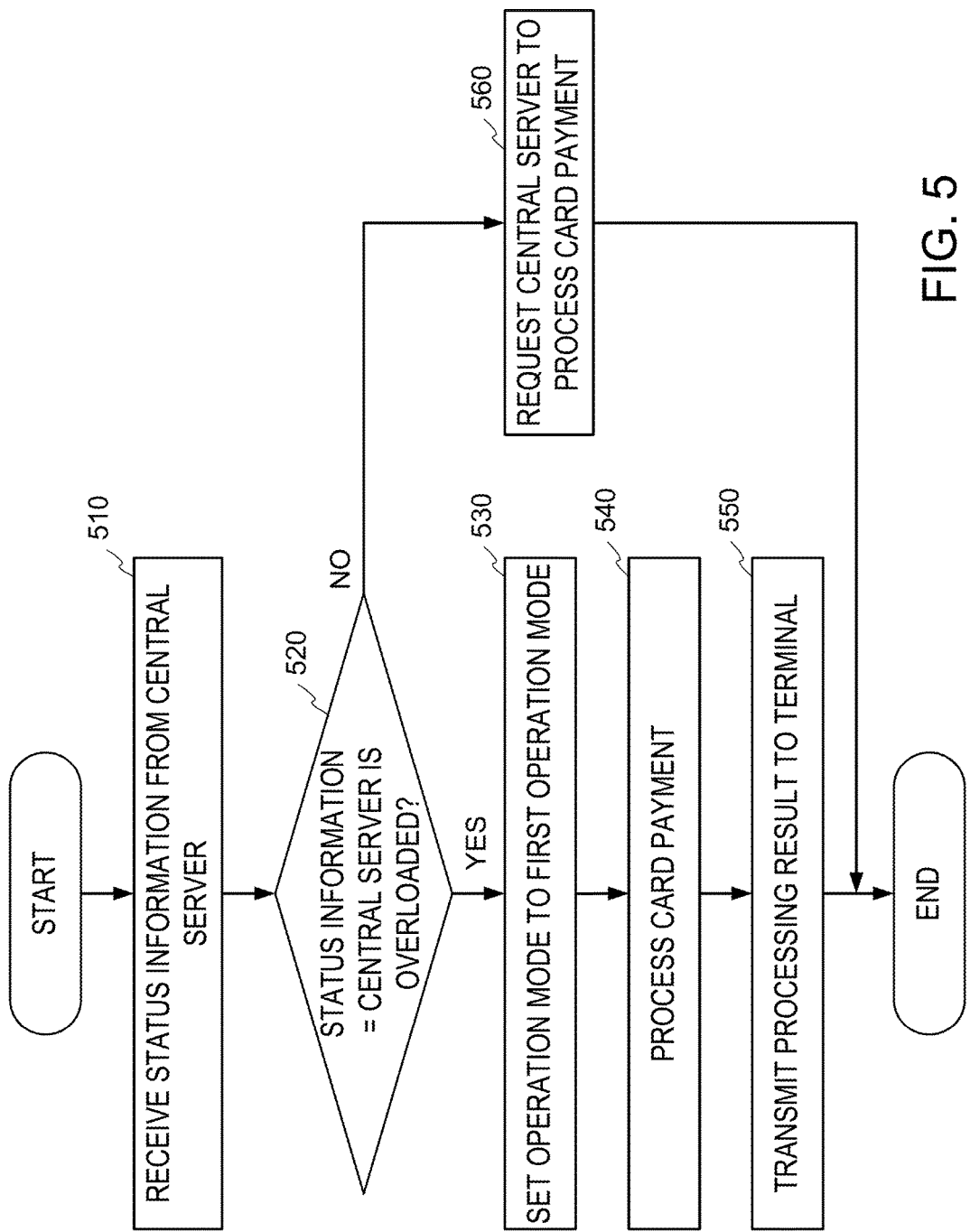
FIG. 5 is a flowchart illustrating an operating method of a distributed server according to an embodiment of the present disclosure.

FIG. 5 is a flowchart illustrating an operating method of a distributed server according to an embodiment of the present disclosure.

Referring to FIG. 5, at step 510, the distributed server receives first status information from a central server, the first status information indicating whether or not the central server is overloaded.

The distributed server determines whether or not the first status information received at step 510 indicates that the central server is overloaded, at step 520.

If it is determined that the first status information does not indicate that the central server is overloaded, the distributed server requests the central server to process a card payment at step 560.

On the other hand, if it is determined that the first status information indicates that the central server is overloaded, the distributed server sets an operation mode thereof to a first operation mode at step 530. At step 540, the distributed server operates in the first operation mode and process a card payment requested by a terminal.

After that, at step 550, the distributed server transmits the processing result of step 540 to the terminal.

Figure 6:
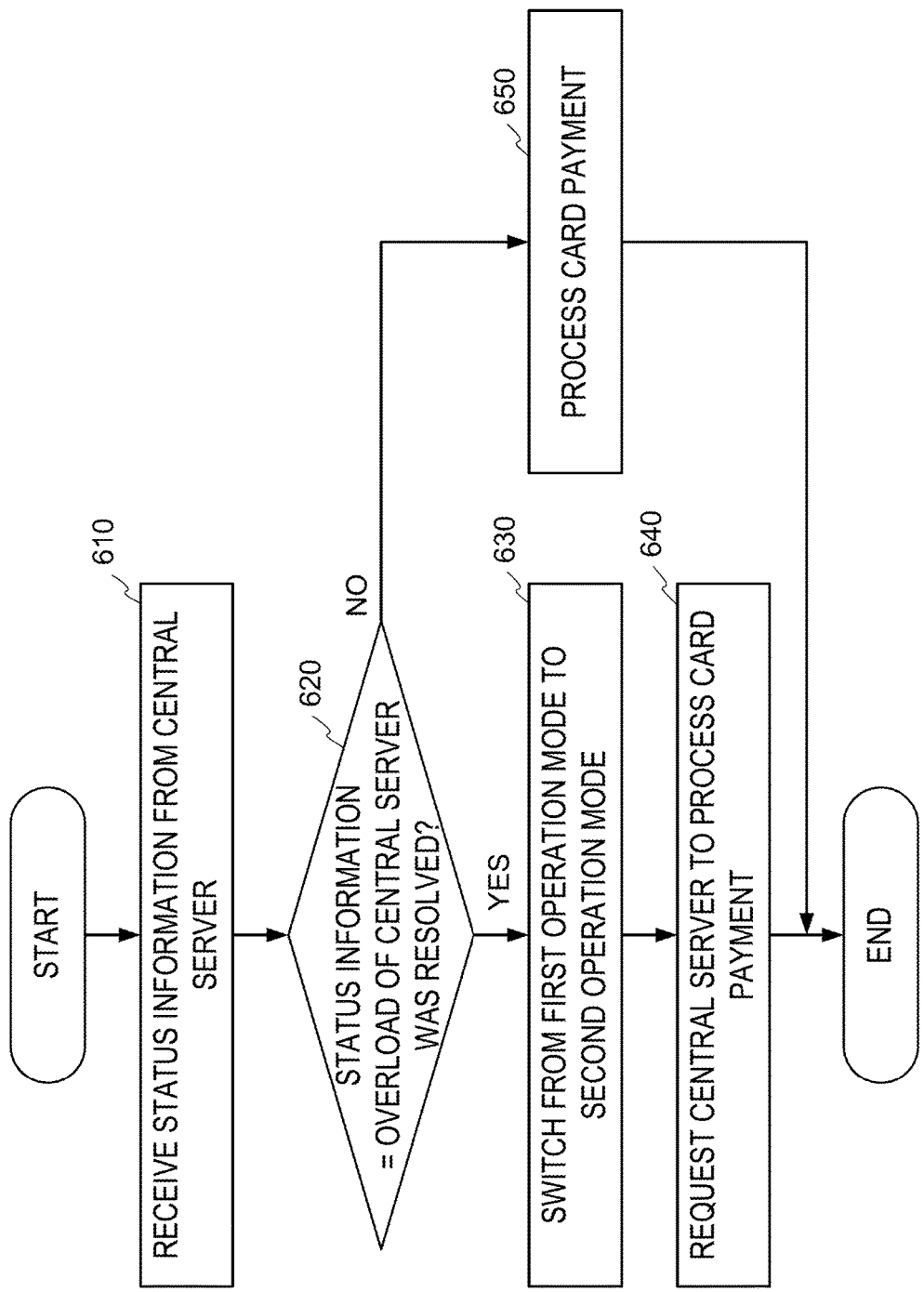
FIG. 6 is a flowchart illustrating an operating method of a distributed server according to an embodiment of the present disclosure.

FIG. 6 is a flowchart illustrating an operating method of a distributed server according to an embodiment of the present disclosure.

Referring to FIG. 6, at step 610, the distributed server receives second status information from a central server, the second status information indicating whether or not the overload of the central server was resolved.

After that, at step 620, the distributed server determines whether or not the second status information received at step 610 indicates that the overload of the central server was resolved.

If it is determined that the second status information does not indicate that the overload of the central server was resolved, the distributed server processes a card payment at step 650.

On the other hand, if it is determined that the second status information indicates that the overload of the central server was resolved, the distributed server switches from the first operation mode to a second operation mode at step 630.

After the distributed server switches to the second operation mode, the distributed server requests the central server to process a card payment, at step 640.

Figure 7:
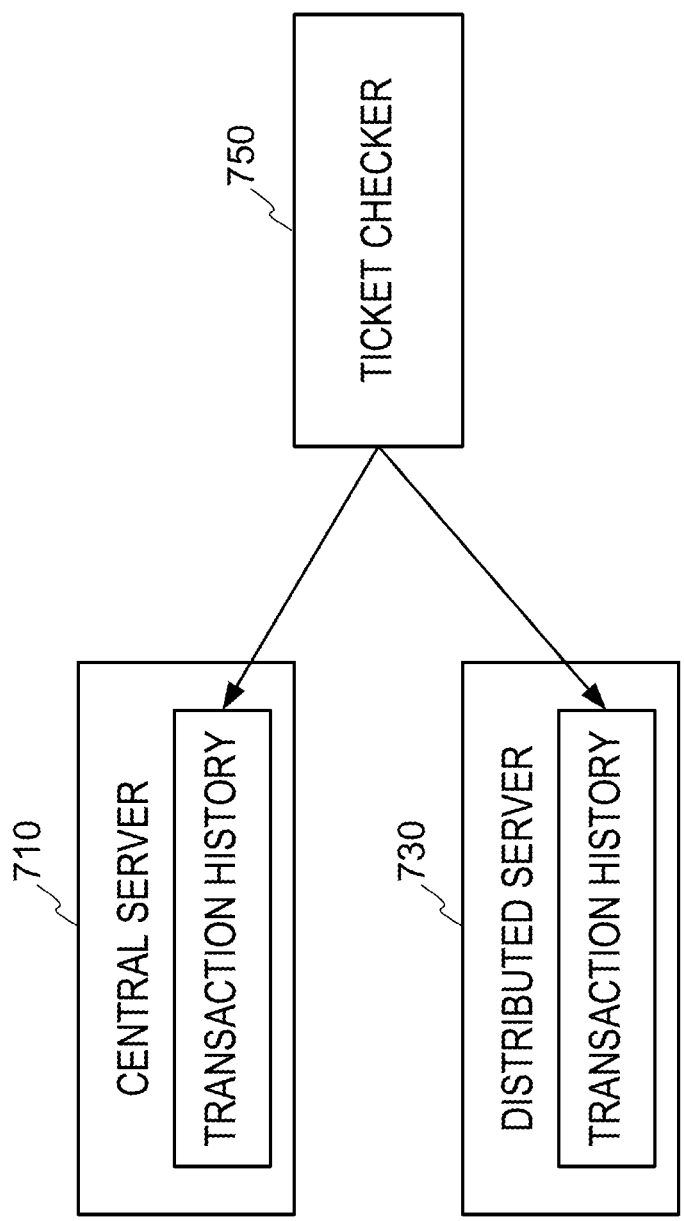
FIG. 7 illustrates a method of detecting an illegal or unauthorized user according to an embodiment of the present disclosure.

FIG. 7 illustrates a method of detecting an illegal or unauthorized user in a distributed processing system according to an embodiment of the present disclosure. Herein, the illegal or unauthorized user may be a user using a lost card or a card that has been reported stolen.

FIG. 7 illustrates a process in which a ticket checker in a distributed processing system checks a transaction history of a user from a central server and a distributed server in accordance with an embodiment.

A ticket checker 750 may first search for the transaction history in the distributed server 730 before searching for the transaction history in the central server 710 when inquiring about the card use history of the user so as to determine whether or not the user is on an illegal or unauthorized ride. If the transaction history exists in the distributed server 730, the ticket checker 750 may end the ticket checking process without accessing the central server 710.

On the other hand, if the transaction history does not exist in the distributed server 730, the ticket checker 750 may search for the transaction history in the central server 710. The ticket checker 750 may check the transaction history in order of a terminal, the distributed server 730, and the central server 710.

In an embodiment, the ticket checker 750 transmits a request to the terminal and the distributed server 730 for the transaction history before accessing the central server 710. As a result, it is possible to prevent duplicate approval (or duplicate payment) from occurring due to a communication problem or a difference in processing times, which may occur when simultaneously accessing the distributed server 730 and the central server 710.

In the embodiment of FIG. 7, the distributed server 730 may include operating information including information related to card transactions and terminal information on one or more card terminals. The information related to card transactions may include a hot list or commutation ticket information. The hot list includes information related to whether or not cards are available, and may include at least one of a black list and a white list. Therefore, the ticket checker 750 searches for the transaction history in the distributed server 730, and determines whether or not the user is on an illegal or unauthorized ride according to whether the transaction history corresponds to information in the black list.

Figure 8:
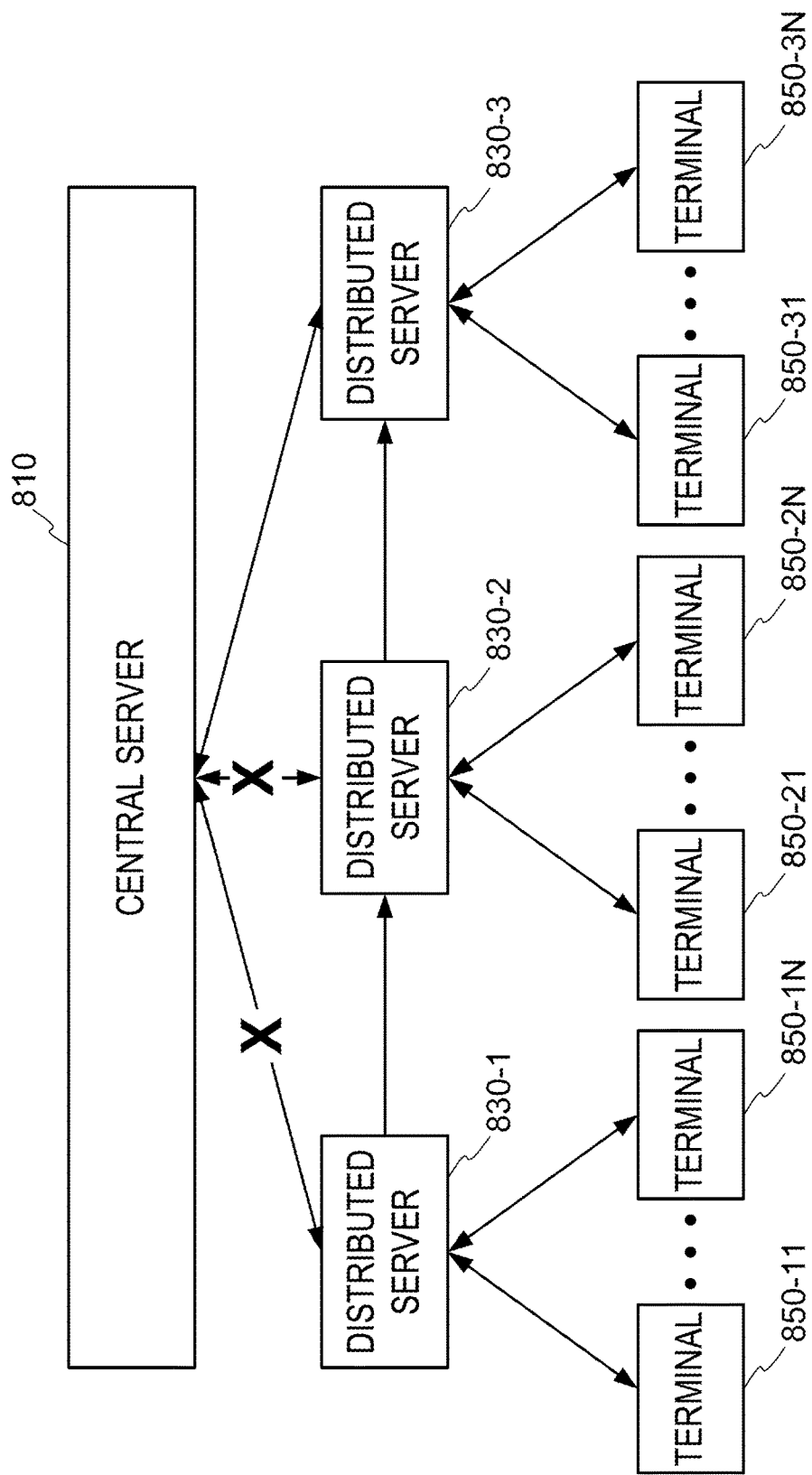
FIG. 8 illustrates a method of establishing a communication bypass route in a distributed processing system according to an embodiment of the present disclosure.

FIG. 8 illustrates a method of establishing a communication bypass route when a communication problem occurs between a central server and some distributed servers in a distributed processing system according to an embodiment of the present disclosure.

In FIG. 8, a route on which a communication problem occurred between the central server 810 and a distributed server, e.g., 830-1 or 830-2, is indicated by 'X'.

As indicated by 'X' on the communication routes between the central server 810 and the distributed servers 830-1 and 830-2 in FIG. 8, the distributed servers 830-1 and 830-2 cannot communicate with the central server 810.

Thus, in order to communicate with the central server 810, the distributed servers 830-1 and 830-2 may search for another distributed server that can communicate with the central server 810, e.g., the distributed server 830-2 in FIG. 8, and communicate with the central server 810 through the distributed server 830-3. In an embodiment, the distributed servers 830-1 to 830-3 may establish a bypass route to bypass the disconnected communication lines using an ad-hoc function.

In an embodiment, the distributed servers 830-1 to 830-3 may perform a switching operation between wired and wireless communications. For example, if communication is disconnected during wired communication between the distributed servers 830-1 to 830-3 and the central server 810, the distributed servers 830-1 to 830-3 may perform communication with the central server 810 by switching from wired communication to wireless communication. On the other hand, if communication is disconnected during wireless communication between the distributed servers 830-1 to 830-3 and the central server 810, the distributed servers 830 may perform communication with the central server 810 by switching from wireless communication to wired communication.

The terminals 850-11 to 850-3N may or may not perform the wired/wireless communication switching function, depending on installation locations thereof. For example, when any of the terminals 850-11 to 850-3N is installed in a bus or subway, the installed terminal may perform the wired/wireless communication switching function.

When the wired/wireless communication switching is impossible or impractical, if communication between any of the terminals 850-11 to 850-3N and the distributed servers 830-1 to 830-3 and between any of the terminals 850-11 to 850-3N and the central server 810 is disconnected, the terminals 850-11 to 850-3N themselves may perform card payment approval process.

Figure 9:
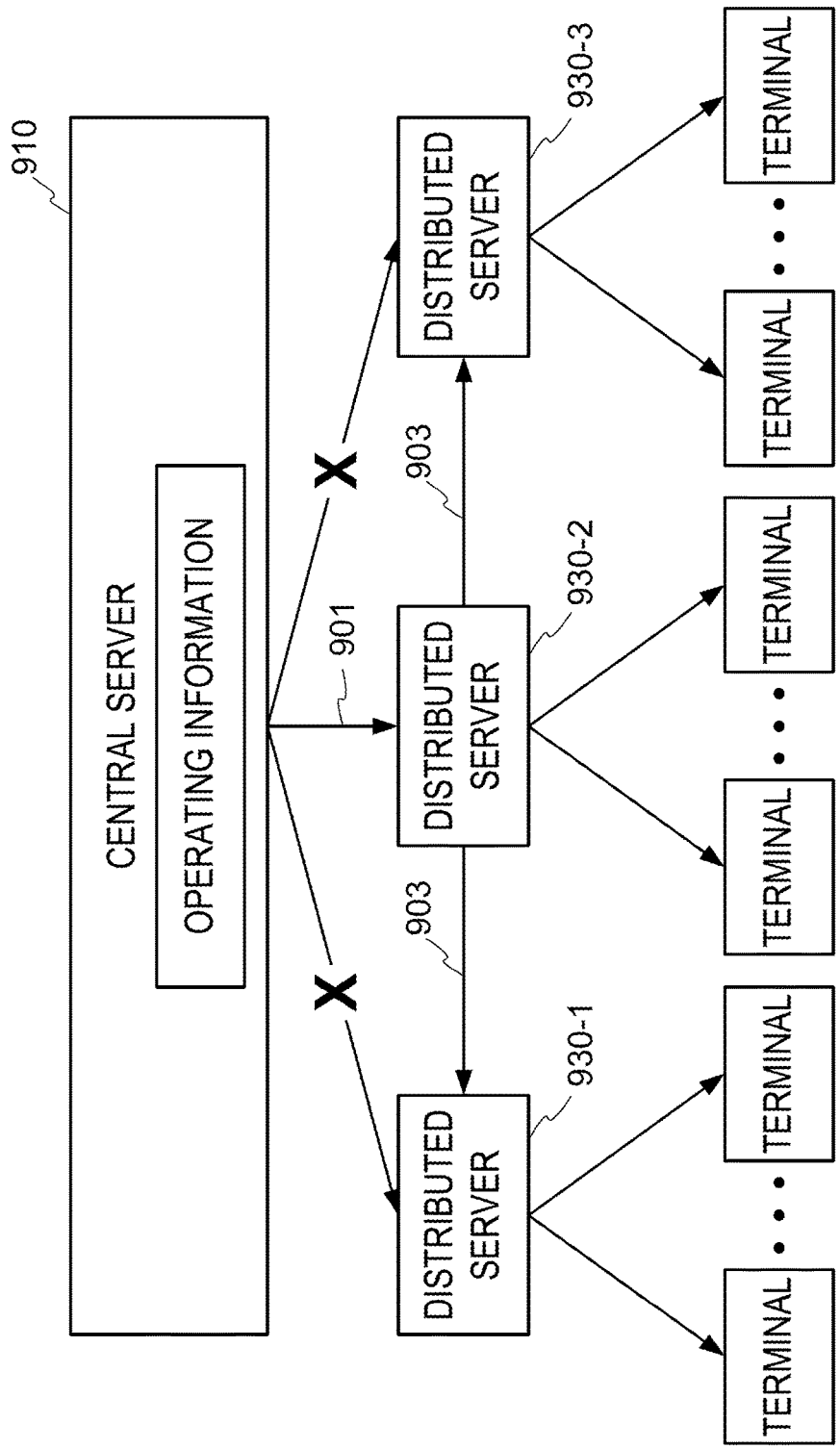
FIG. 9 illustrates a method of distributing operating information through distributed servers in a distributed processing system according to an embodiment of the present disclosure.

FIG. 9 illustrates a method of distributing operating information through distributed servers in a distributed processing system according to an embodiment of the present disclosure.

FIG. 9 illustrates that the central server 910 communicates with a specific one, e.g., 930-2, of the distributed servers 930-1 to 930-3.

The central server 910 may transmit the operating information only to the distributed server 930-2 among the distributed servers 930-1 to 930-3 as indicated by reference numeral 901.

The distributed server 930-2 to which the operating information is transmitted from the central server 910 may transmit the operating information to other distributed servers 930-1 and 930-2, which are not communicating with the central server 910, as indicated by reference numeral 903.

Figure 10:
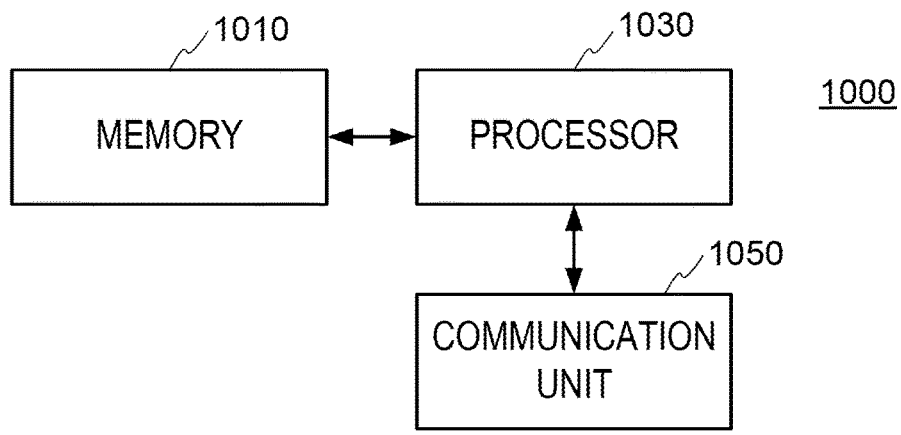
FIG. 10 is a block diagram of a distributed server according to an embodiment of the present disclosure.

FIG. 10 is a block diagram of a distributed server according to an embodiment of the present disclosure.

Referring to FIG. 10, the distributed server 1000 includes a memory 1010, a processor 1030, and a communication unit 1050.

The memory 1010 may store a program for controlling operations of the distributed server 1000.

The processor 1030 may execute the program stored in the memory 1010 to perform the operations of the distributed server 1000. Although only one processor 1030 is shown in FIG. 10, embodiments are not limited thereto. In other embodiments, a distributed server 1000 may include one or more processors that perform operations of the distributed server 1000.

By executing the program, the processor 1030 may download operating information, which includes information related to card transactions and terminal information of one or more terminals, from a central server. In addition, the processor 1030 may receive a payment request for a card tagged on a terminal through the communication unit 1050 from the terminal, and process card payment for the tagged card based on the operating information.

The processor 1030 may also receive first status information from the central server through the communication unit 1050, which indicates whether or not the central server is overloaded. The processor 1030 may set an operation mode of the distributed server 1000 to a first operation mode when the first status information indicates that the central server is overloaded. In the first operation mode, the distributed server 1000 processes the card payment requested by the terminal. The processor 1030 may transmit the result of processing the card payment to the terminal through the communication unit 1050.

Furthermore, the processor 1030 may receive second status information from the central server through the communication unit 1050, which indicates whether or not the overload of the central server has been resolved. When the second status information indicates that the overload of the central server has been resolved, the processor 1030 may switch the distributed server 1000 from the first operation mode to a second operation mode. In the second operation mode, the distributed server 1000 may request the central server to process a transaction, e.g., the card payment, requested by the terminal, through the communication unit 1050.

The communication unit 1050 may perform wired/wireless communication with the central server, other distributed servers, or a plurality of terminals.

Figure 11:
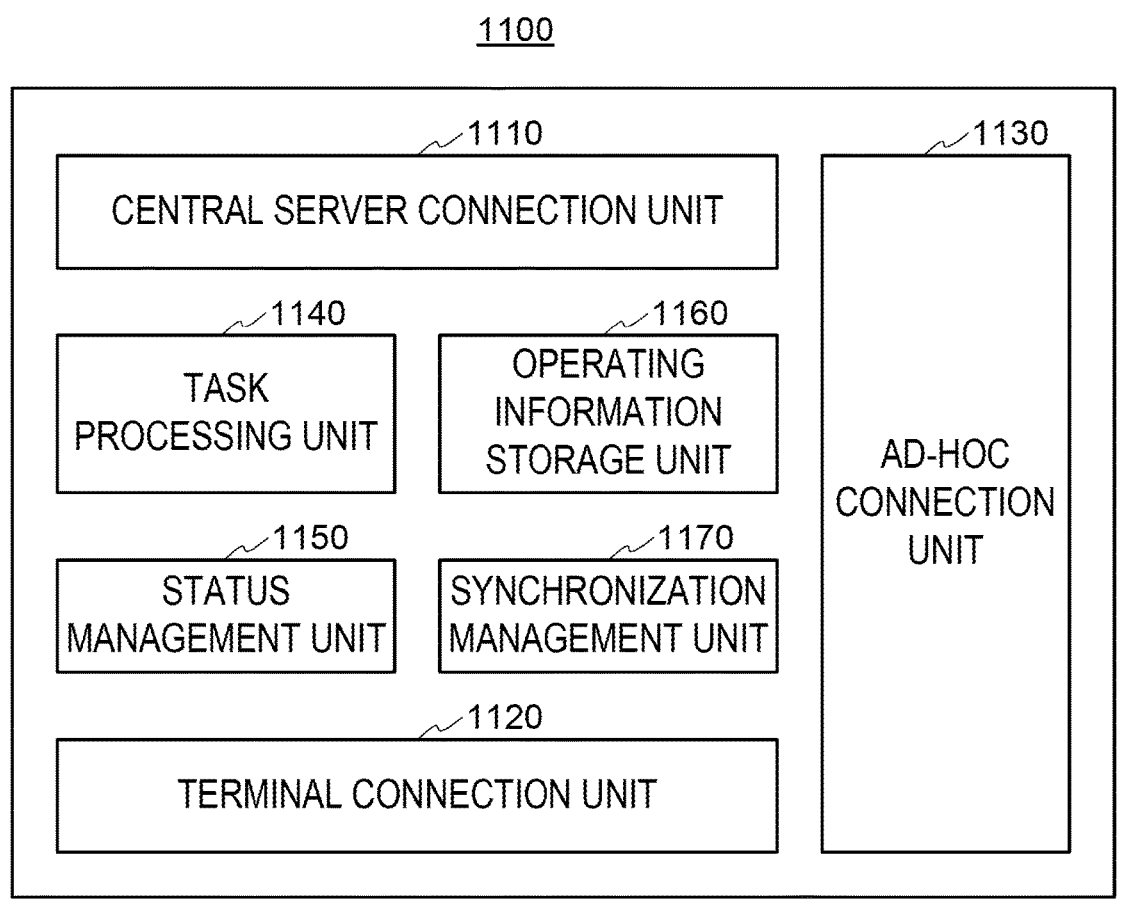
FIG. 11 is a block diagram of a distributed server according to another embodiment of the present disclosure.

FIG. 11 is a block diagram of a distributed server according to another embodiment of the present disclosure.

Referring to FIG. 11, the distributed server 1100 includes a central server connection unit 1110, a terminal connection unit 1120, an ad-hoc connection unit 1130, a task processing unit 1140, a status management unit 1150, an operating information storage unit 1160, and a synchronization management unit 1170.

The central server connection unit 1110 may manage a connection between a central server and the distributed server 1100.

The terminal connection unit 1120 may manage connections between a plurality of terminals and the distributed server 1100.

The ad-hoc connection unit 1130 may manage connections between the distributed server 1100 and other distributed servers.

The central server connection unit 1110, the terminal connection unit 1120, and the ad-hoc connection 1130 may be collectively referred to as a communication unit.

The task processing unit 1140 may perform a task related to an operation of processing a transportation fee for a card. For example, the task processing unit 1140 may perform an operation of processing a transportation fee for a card tagged on a terminal connected to the distributed server 1100 and/or an operation of checking whether or not the card has been tagged several times within a predetermined time period.

The status management unit 1150 may perform status management, such as mode setting or mode switching of the distributed server 1100, based on status information received from the central server.

For example, when excessive traffic is concentrated on the central server and the traffic exceeds a processing limit of the central server, the central server may transmit first status information to the distributed server 1100, indicating that the central server is overloaded.

The distributed server 1100 receiving the first status information may set an operation mode to a first operation mode, and process card payment requested by a terminal using information stored therein, without accessing the central server.

After the overload of the central server has been resolved, the central server may push second status information to the distributed server 1100, indicating that the overload of the central server was resolved.

If the second status information is received from the central server, the distributed server 1100 may switch from the first operation mode to a second operation mode in which the distributed server 1100 requests the central server to process the card payment requested by the terminal.

The status management unit 1150 may perform the status management of the distributed server 1100 as described above.

The operating information storage unit 1160 may store operating information received from the central server through the central server connection unit 1110. The operating information may include information related to card transactions, such as a hot list, valid commutation ticket information, information on one or more terminals, and so on.

The synchronization management unit 1170 may synchronize an operation of the central server with an operation of the distributed server 1100 connected to the central server so that a program is executed in a timely manner and the operating information is timely provided.

Methods according to embodiments of the present disclosure may be implemented in the form of program commands which can be executed through various computer units, and then written to computer readable media. The computer readable media may include a program command, a data file, a data structure, or a combination thereof. Examples of the computer readable media may include magnetic media such as a hard disk, a floppy disk and a magnetic tape, optical media such as CD-ROM and DVD, magneto-optical media such as a floptical disk, and hardware devices, such as ROM, RAM and flash memory, configured to store and execute a program command. Examples of the program command may include a machine language code created by a compiler and a high-level language code executed by a computer through an interpreter or the like. The hardware device may be configured to operate as one or more software modules to perform the operation of the present invention, and vice versa.

While some embodiments have been described, it will be apparent to those skilled in the art that various changes and modifications may be made without departing from the spirit and scope of the present invention. For example, appropriate results can be achieved even when the above-described technologies are performed in a different order from those described and/or even when elements such as described systems, structures, apparatuses, and circuits are connected or combined in a different form from those described or are replaced or substituted by other elements or equivalents.

Thus, the scope of the present invention is not limited to the above-described embodiments, but may be defined by the following claims and equivalents to the claims.

What is claimed is:

1. An operating method of a distributed server in a distributed transportation fee payment processing system, the operating method comprising:
    receiving, by the distributed server, status information from a central server, the status information indicating whether or not the central server is overloaded;
    downloading, by the distributed server, operating information from the central server, the operating information including information related to card transactions and terminal information on a plurality of card terminals;
    receiving, by the distributed server, a transportation fee payment request for a card tagged on one of the plurality of card terminals from the card terminal;
    when the status information indicates the central server is not overloaded, forwarding, by the distributed server, the transportation fee payment request to the central server;
    when the status information indicates the central server is overloaded, generating, by the distributed server, a result by processing the transportation fee payment request from the card terminal based on the operating information; and
    transmitting, by the distributed server, the result of processing the transportation fee payment request to the card terminal,
    wherein the distributed server is disposed between the central server and the plurality of card terminals, and
    wherein the distributed server is one of a plurality of distributed servers, the central server being coupled to each of the plurality of distributed servers, each of the plurality of distributed servers corresponding to a region and being coupled to a plurality of card terminals.

2. The operating method of claim 1, wherein the status information is pushed to the distributed server from the central server when the central server is in an overloaded state in which traffic for card payments exceeds a processing limit of the central server or after the overload of the central server is resolved.

3. The operating method of claim 2, wherein the processing limit comprises a preset limit for at least one of the number of transactions being simultaneously processed, a processing time for each transaction, and available resources of the central server.

4. The operating method of claim 1, wherein the status information is first status information, and
    wherein the method further comprises:
    receiving, by the distributed server, second status information from the central server, the second status information indicating that the overload of the central server has been resolved; and
    requesting, by the distributed server, the central server to process the transportation fee payment request from the card terminal when the second status information indicates that the overload of the central server has been resolved.

5. The operating method of claim 1, wherein receiving the status information comprises receiving the status information through a communication channel that is separate from a communication channel through which the operating information is received.

6. The operating method of claim 1, wherein processing the transportation fee payment request comprises processing the transportation fee payment request when the card tagged on the card terminal is determined to be a commutation ticket based on the operating information.

7. The operating method of claim 1, wherein processing the transportation fee payment request comprises:
    determining whether or not the card is tagged on the card terminal more than one time within a predetermined time based on the operating information;
    informing the card terminal that a transportation fee for the card has been paid if it is determined that the card is tagged more than one time within the predetermined time; and
    requesting the central server to process the transportation fee payment request for the card when it is determined that the card is tagged only one time.

8. The operating method of claim 1, further comprising:
    searching for, by the distributed server, another distributed server capable of communicating with the central server when communication between the central server and the distributed server is disconnected; and
    communicating, by the distributed server, with the central server through a found distributed server.

9. The operating method of claim 1, further comprising transmitting, by the distributed server, the operating information to another distributed server that is unable to communicate with the central server.

10. An operating method of a central server in a distributed transportation fee payment processing system, the operating method comprising:
processing, by the central server, transportation fee payment requests based on traffic for card payments received from a plurality of distributed servers;
determining, by the central server, whether the traffic for card payments exceeds a processing limit of the central server;
transmitting, by the central server, status information to the plurality of distributed servers based on the determination result, the status information indicating whether or not the central server is overloaded; and
transmitting, by the central server, operating information to the plurality of distributed servers, the operating information including information related to transactions of cards and terminal information on a plurality of card terminals,
wherein when the status information indicates the central server is overloaded, the plurality of distributed servers process the transportation fee payment requests based on the operating information, and transmit a result of processing the transportation fee payment requests to the card terminal, and
wherein the plurality of distributed servers are disposed between the central server and the plurality of card terminals, and each of the plurality of distributed servers corresponds to a region and is connected to at least one corresponding terminal of the plurality of card terminals.

11. The operating method of claim 10, wherein the status information is first status information and wherein the method further comprises:
determining, by the central server, whether or not the overload has been resolved; and
transmitting, by the central server, second status information to the plurality of distributed servers, the second status information indicating that the overload of the central server has been resolved.

12. The operating method of claim 10, wherein the status information is pushed to the plurality of distributed servers from the central server when the central server is in an overloaded state in which the traffic exceeds the processing limit or after the overload of the central server is resolved.

13. The operating method of claim 10, wherein the processing limit of the central server comprises a preset limit for at least one of the number of transactions being simultaneously processed, a processing time for each transaction, and available resources of the central server.

14. The operating method of claim 10, wherein transmitting the status information comprises transmitting the status information through a communication channel that is separate from a communication channel through which the operating information is transmitted.

15. A distributed server in a distributed transportation fee payment processing system, the distributed server comprising:
a memory configured to store a program for controlling operations of the distributed server; and
one or more processors configured to execute the program,
wherein the processor performs a method, the method comprising:
receiving status information from a central server, the status information indicating whether or not the central server is overloaded;
downloading operating information from the central server, the operating information including information related to card transactions and terminal information on a plurality of card terminals;
receiving a transportation fee payment request for a card tagged on one of the plurality of card terminals from the card terminal;
when the status information indicates the central server is overloaded, processing the transportation fee payment request from the card terminal based on the operating information, and transmitting a result of processing the payment to the card terminal; and
when the status information indicates the central server is not overloaded, forwarding the transportation fee payment request to the central server,
wherein the distributed server is one of a plurality of distributed servers, the central server being coupled to each of the plurality of distributed servers, each of the plurality of distributed servers corresponding to a region and being coupled to a plurality of card terminals.

16. A distributed transportation fee payment processing system comprising:
one or more card terminals each of which is configured to request a transportation fee payment for a card tagged thereon;
a plurality of distributed servers configured to receive operating information, which includes information related to transactions of the card and terminal information on the one or more card terminals, and status information, which indicates whether or not a central server is overloaded, from the central server, to process the transportation fee payment requested by the card terminal based on the operating information when the status information indicates that the central server is overloaded and transmit a result of processing the transportation fee payment to the card terminal, and to forward the transportation fee payment to the central server when the status information indicates the central server is not overloaded; and
the central server configured to determine whether or not traffic for payments of cards, received from the plurality of distributed servers, exceeds a processing limit thereof, and transmit the status information to the plurality of distributed servers based on the determination result.

17. A non-transitory computer-readable medium having stored thereon computer-executable instructions, which, when executed by a processor in a distributed server of a distributed transportation fee payment processing system, performs a method, the method comprising:
receiving status information from a central server, the status information indicating whether or not the central server is overloaded;
downloading operating information from the central server, the operating information including information related to card transactions and terminal information on one or more card terminals;
receiving a transportation fee payment request for a card tagged on a card terminal from the card terminal;
processing the transportation fee payment request from the card terminal based on the operating information when first status information is received from the central server, the first status information indicating that the central server is overloaded, and transmitting a result of the payment processed by the distributed server to the card terminal; and transmitting the transportation fee payment request to the central terminal and requesting the central server to process the transportation fee payment request when second status information is received from the central server, the second status information indicating that the overload of the central server is not overloaded.

* * * * *